INVENTOR.
James R. Alburger

United States Patent Office 3,341,705
Patented Sept. 12, 1967

3,341,705
METHOD OF CONTROLLING THE THICKNESS OF APPLIED THIN LIQUID FILMS USING DYE TRACERS
James R. Alburger, 5007 Hillard Ave., La Canada, Calif. 91011
Filed Apr. 1, 1965, Ser. No. 444,659
9 Claims. (Cl. 250—71)

ABSTRACT OF THE DISCLOSURE

A method of measuring and controlling the thickness of applied liquid films which utilizes the phenomenon of failure of Beer's Law in thin films. A tracer dye is dissolved in the liquid material to be applied as a thin film, the dye concentration being adjusted so that the dimensional transition of color or fluorescence, due to failure of Beer's Law, occurs at the desired film thickness. Thickness of the applied film is then measured by observing the apparent fluorescent brightness or depth of color, and thickness is controlled by adjusting the fluorescent brightness or depth of color of the liquid film to a point somewhere on the steep portion of the transition curve.

---

This invention relates to a method of and means for measuring and controlling the thickness of films of liquids or liquid resinous materials. More particularly, the invention relates to the measurement and control of liquid film thicknesses which are small with respect to the wavelength of light.

For the purpose of this specification, the term "liquid" refers to liquid solvent materials and to plastic resinous materials which may include air-drying plastic resins dissolved in solvent carriers, thermoplastic resins which may be liquid at elevated temperatures and which solidify when cooled, and thermosetting resins which may be cured from a liquid condition to a solid form.

There are numerous industrial processes which require an accurate control in the application to surfaces of extremely thin films of liquids or liquid plastic resinous materials. Such processes include the application of surface coaters, layers of insulating or electronic barrier materials, coatings of fungicides or other protective materials, layers of cements or adhesives, and the like. For example, the use of a bonding cement in the fabrication of wire-wound potentiometers requires the accurate control of film thickness in the bonding cement. Also, it may be required that thin deposits of dissolved or suspended substances shall be applied to a surface, leaving the substance on the surface in dry form after its liquid carrier evaporates. In many of these coating processes, the thickness of the applied film of material may be much smaller than the wavelength of visible light. Under such circumstances, it is difficult to accurately measure and control the film thickness by use of conventional measurement methods.

It has been found that it is possible to accurately measure and control the thickness of liquid or liquid resinous films by making use of the discontinuous character of dye tracer materials.

The principal object of this invention, therefore, is to provide a method of accurately measuring the thickness of liquid film.

Another object of the invention is to provide a method of accurately controlling the thickness of applied liquid films.

Still another object of the invention is to provide a quality assurance method for the production testing and control of liquid film thicknesses.

A better understanding of this invention may be had from the following detailed description when read in conjunction with the accompanying drawings, in which.

In order to properly understand the following description of the invention and the embodiment thereof, it is first necessary to understand what is meant by the term "sensitizer dye." This term, as used herein, refers to a subtractive visible color dye mixture or an ultraviolet responsive fluorescent dye mixture in a liquid carrier which provides a degree of dimensional sensitivity suitable for tracer usage. This definition is mainly a matter of convention in usage of such materials, since a tracer material in order to be useful as such must provide fluorescence or subtractive color response in liquid film thicknesses less than about 1000 millimicrons.

It has been discovered that all dyes in solution, be they nonfluorescent visible color or fluorescent, exhibit transitions of color or fluorescence in thin films such that for a given concentration of the dye there is always a certain critical film thickness above which a fluorescence or color responsse is obtained and below which the fluorescence or color response diminishes to substantially zero. In addition, it has been discovered that the dimensional ranges over which such transitions of fluorescence or color occur may be relatively narrow.

Sensitizer dyes are clearly differentiated from ordinary solutions of dyes or coloring materials in that such ordinary dye solutions do not normally provide a color or fluorescence response in liquid film thicknesses less than about 1000 millimicrons. Ordinary dye solutions are often useful in providing color or fluorescent effects in thick films or layers of liquid, as in paints, lacquers, or even in certain types of indicator materials where the indicated film thicknesses are relatively large. Such dyes and dye mixtures are properly designated "color-former dyes" as contrasted with "sensitizer dyes" which provide color or fluorescence response in relatively thin films.

Sensitizer dyes may be either nonfluorescent visible color or fluorescent in character, and the sensitizer dye mixtures or solutions may provide fluorescence or color response at liquid film thicknesses smaller than 1000 millimicrons. Such highly sensitive mixtures are known and properly designated by the term "dye tracers." The above-stated differentiation between the two types of dye materials has been described in detail in my copending application, Ser. No. 323,529, filed Nov. 13, 1963, and now abandoned. In addition, the effect of dimensional thresholds and the transition of color and fluorescence response and a means for measuring same is described and claimed in my Patent No. 3,107,298, of Oct. 15, 1963.

Figure 1:
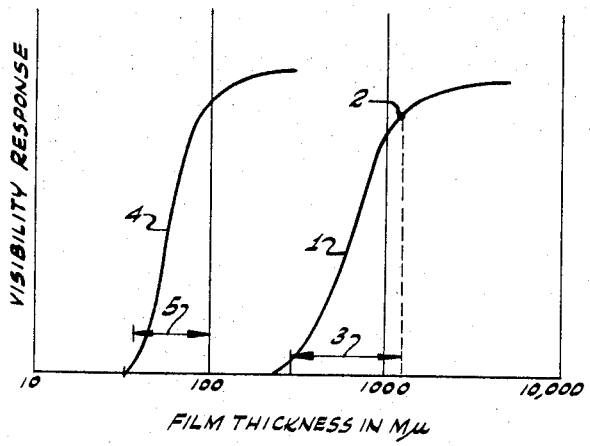
FIG. 1 is a graph which illustrates the method of the invention for controlling and measuring film thickness which utilizes the transition of color of fluorescence which is characteristic for a given concentration of sensitizer dye dissolved in the liquid.

Referring, now, to FIG. 1, the curve 1 is a characteristic curve of visible response for a dye tracer plotted as a function of liquid film thickness. It will be noted that below a certain critical film thickness, the fluorescence or color response, as the case may be, undergoes a transition from a maximum level down to substantially zero brightness or color density as film thickness is reduced.

As an example, in the region 2, a "shoulder" is found on the characteristic visibility response curve 1. Above this region of liquid film thicknesses, the fluorescent brightness response of a fluorescent dye tracer ends to level off to a constant value, for the reason that substantially all of the available exciting radiation becomes adsorbed in the liquid film so that a further increase in film thickness does not contribute a corresponding increase in fluorescent brightness.

In the case of visible color dye tracers, in the region of liquid film thicknesses above the shoulder 2 of the characteristic curve, the color density response follows Beer's law of absorption. However, below this shoulder region, a discontinuity or failure in Beer's law occurs so that the color density falls rapidly toward zero.

In visible color or fluorescent dye tracers wherein the shoulder region 2 occurs at about 1000 millimicrons or less, the slopes of the characteristic curves are fairly steep, such that a change in liquid film thickness by a factor of 10 may result in a change of color density of fluorescent brightness from substantially zero to about maximum or vice versa. Referring again to FIG. 1, it is seen that the width of the region of fluorescence or color transition 3 may be relatively small. In general, it has been found that the slope of color or fluorescence transition becomes steeper as the characteristic curve is moved to the left on the chart as indicated by Curve 4. In Curve 4, it is seen that the width of the transition region 5 may be as small as 40 millimicrons where the shoulder of the characteristic curve is in the range of about 100 millimicrons.

The position of the Curves 2 and 4 with respect to the horizontal axis of the chart depends on the concentration of the particular sensitizer dye which is utilized. A means for measuring the point at which this transition occurs has been described in my Patent No. 3,107,298 mentioned above. Where it is desired to select a particular dimensioned condition at which the transition of color or fluorescence shall take place, it is merely necessary to adjust the concentration of the sensitizer dye to an appropriate point. This can be accomplished by plotting a curve of tracer threshold values as a function of dye concentration for a specific sensitizer dye. Once such a dilution curve is established, the transition condition for the dyed tracer can be adjusted to a desired point by selecting the proper dye concentration from the dilution curve. The liquid material is then tagged with the sensitizer dye by adding the dye up to the thus-determined required concentration.

Having established an appropriate tracer characteristtic in accordance with the above-described method, a liquid film may now be applied to a surface and first controlled as to its thickness and second measured as to its thickness by comparison methods as follows:

First, the liquid material is tagged with a suitable sensitizer dye as described above, the concentration of the dye being adjusted to provide a fluorescence or color transition at the desired dimensional range.

Second, the tagged liquid material is applied to a surface by appropriate technique. The material is then squeezed or wiped from the surface or else is allowed to drain from the surface for a suitable length of time so as to leave a film of liquid remaining on the surface. At this point, an inspection of the coated surface will reveal a color or fluorescence under ultraviolet light, as the case may be, the color density or fluorescent brightness being dependent on the thickness of the liquid film.

Third, the thickness of the applied liquid film may be controlled with good accuracy by allowing the material to drain off of the surface until the color or fluorescence diminishes close to the vanishing point. Under such conditions, it is known that the liquid film thickness must be close to that corresponding to the toe of the response curve, and this dimension may be accurately measured by the well known "Meniscus Method" of the above-mentioned Patent No. 3,107,298.

It is, of course, obvious that in the above-described method of controlling film thickness, the tagged liquid material could be applied by spray or by any other suitable method so as to bring the film thickness up to a desired point as shown by the appearance of fluorescence or color response. This technique is particularly advantageous where the tagged material is a liquid plastic resin which tends to dry or harden rapidly to a solid film, and in which draining of the liquid to reach a desired film thickness would not be practical.

Figure 2:
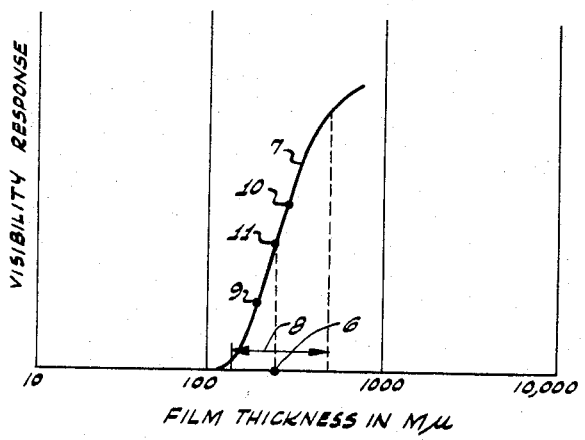
FIG. 2 is a graph which illustrates the method of the invention for controlling film thickness by the use of comparison reference plaques.

An accurate yet practical method of controlling the thickness of applied liquid or liquid resinous films in a production operation involves the use of one or two reference plaques which may be prepared and utilized as follows:

Referring, now, to FIG. 2, similar to FIG. 1, the point 6 on the chart represents the desired thickness of liquid films which are to be applied in the production operation. The liquid material is now tagged with a sensitizer dye as described above, the concentration of the sensitizer dye being adjusted to an appropriate value so that a characteristic Curve 7 is provided in which the dimensional range 8 over which the transition of color or fluorescence occurs is about centered on the desired film thickness 6.

Two reference plaques are now prepared using the same tagged liquid material, the apparent color density or fluorescence response for one plaque being slightly above the toe of the curve as illustrated by point 9, and the apparent color density or fluorescence response for the other plaque being slightly below the shoulder of the curve as illustrated by point 10. It is now known that the color density or fluorescence response of surface coatings having the desired film thickness would fall between the two extreme conditions represented by the two reference plaques. It is, therefore, only necessary to maintain the color density or fluorescence response, as the case may be, of the production material within or between the maximum and minimum conditions represented by the two reference plaques. This can be readily accomplished by a simple visual inspection, and very little skill is required to yield an accurate quality control or selection of the production material.

As an alternative procedure, similar to the above, it is possible to achieve good control and satisfactory quality assurance in the production of applied films by the use of only one reference plaque. In this modification of the method, the tagged liquid material is applied to a surface in an amount sufficient to bring the apparent color or fluorescence response to a point which matches that of the reference plaque. As an example, if a reference plaque is prepared which has a response characteristic corresponding to point 11, it is then possible to readily select by side-by-side comparison with the reference plaque, color or brightness conditions in the production coatings which are matching within a few percent on the brightness scale. By using reasonable care, an inspector can control the film thickness of a material in a production operation to within plus or minus 10 millimicrons of a desired film thickness of 80 millimicrons, or to within plus or minus 100 millimicrons of a desired film thickness in the range of 1000 millimicrons.

Figure 3:
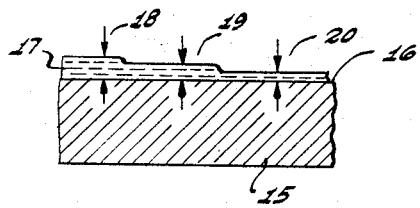
FIG. 3 is a representation, in cross section, of a surface on which there is coated a liquid material of the invention having different film thicknesses.

Referring now to FIG. 3, a panel 15 has coated on its surface 16 a layer of liquid material 17 having different thickness represented by regions 18, 19, and 20. A fluorescent tracer dye is dissolved in the liquid material in an appropriate concentration such that at a film thickness represented by region 18, there is provided a fluorescence response corresponding to point 10 of FIG. 2. Also, at the film thickness represented by the region 19, a fluorescence response is obtained corresponding to point 11 of FIG. 2. Finally, the film thickness at region 20 yields a fluorescence response coresponding to point 9 of FIG. 2.

By examining the coating 17 under black light, the film thicknesses of regions 18, 19, and 20 may be judged, and similar coatings of the liquid material may be controlled as to film thickness simply by adjusting the fluorescence response to an appropriate apparent brightness. As indicated above, a non-fluorescent visible color may be substituted for the fluorescent tracer dye, with appropriate corrections in dye concentration for providing a transition of color density at a desired range of film thicknesses.

It is apparent from the foregoing specification that this invention provides an accurate yet easily utilized method for the measurement, control, and quality assurance in production of surface coatings of liquid or liquid resinous materials wherein such coatings must have film thicknesses in the dimensional range from about the wavelength of visible light down to about one tenth the wavelength of visible light.

I claim:

1. A method of controlling the thickness of an applied liquid film comprising the steps of
    (a) tagging said liquid with a sensitizer dye and adjusting the concentration of said sensitizer dye to a point where the dimensional range, over which the transition of visibility response of said tagged liquid occurs, corresponds to the desired thickness of said liquid film, and
    (b) applying said tagged liquid to a surface in an amount sufficient to bring the visibility response of the applied liquid film to a point within the transition region of the characteristic response curve of said tagged liquid.

2. A method in accordance with claim 1 in which said sensitizer dye produces a visible fluorescence responsive to ultraviolet light.

3. A method in accordance with claim 1 in which said sensitizer dye produces a nonfluorescent visible color.

4. A method of controlling the thickness of an applied liquid film comprising the steps of
    (a) tagging a liquid with a sensitizer dye and adjusting the concentration of said sensitizer dye to a point where the dimensional range, over which the transition of visibility response of the tagged liquid occurs, corresponds to the desired thickness of said liquid film,
    (b) preparing a reference plaque having the desired film thickness of the said tagged liquid, and
    (c) applying said tagged liquid to a surface in an amount sufficient to bring the visibility response of said applied film to a point which substantially matches the visibility response of said reference plaque.

5. A method in accordance with claim 4 in which said sensitizer dye produces a visible fluorescence responsive to ultraviolet light.

6. A method in accordance with claim 4 in which said sensitizer dye produces a nonfluorescent visible color.

7. A method of controlling the thickness of an applied liquid film comprising the steps of
    (a) tagging a liquid with a sensitizer dye and adjusting the concentration of said sensitizer dye to a point where the dimensional range, over which the transition of visibility response of said tagged liquid occurs, corresponds to the desired thickness of said liquid film,
    (b) preparing two reference plaques, having film thicknesses of the said tagged liquid such that one of said plaques has a film thickness slightly less than the desired film thickness and said other plaque has a film thickness slightly greater than the desired film thickness, and
    (c) applying said tagged liquid to a surface in an amount sufficient to bring the visibility response of the applied film to a point between the visibility response characteristics of said two reference plaques.

8. A method in accordance with claim 7 in which said sensitizer dye produces a visible fluorescence responsive to ultraviolet light.

9. A method in accordance with claim 7 in which said sensitizer dye produces a nonfluorescent visible color.

References Cited

UNITED STATES PATENTS

| | | | |
|---|---|---|---|
| 2,763,784 | 9/1956 | Webster | 250—71 X |
| 3,107,298 | 10/1963 | Alburger | 250—71 |

RALPH G. NILSON, *Primary Examiner.*

ARCHIE R. BORCHELT, *Examiner.*

A. B. CROFT, *Assistant Examiner.*

UNITED STATES PATENT OFFICE
CERTIFICATE OF CORRECTION

Patent No. 3,341,705                                      September 12, 1967

James R. Alburger

It is hereby certified that error appears in the above numbered patent requiring correction and that the said Letters Patent should read as corrected below.

Column 1, line 12, beginning with "A method of" strike out all to and including "the transition curve." in line 24, same column 1 and insert instead > A method of measuring and controlling the thickness of applied liquid films which utilizes the phenomenon of Beer's Law transition in thin films. A tracer dye is dissolved in the liquid material to be applied as a thin film, the dye concentration being adjusted so that the dimensional transition of color or fluorescence, due to Beer's Law transition, occurs at the desired film thickness. Thickness of the applied film is then measured by observing the apparent fluorescent brightness or depth of color, and thickness is controlled by adjusting the fluorescent brightness or depth of color of the liquid film to a point somewhere on the steep portion of the transition curve.

Signed and sealed this 24th day of September 1968.

(SEAL)
Attest:

EDWARD M. FLETCHER, JR.                         EDWARD J. BRENNER
Attesting Officer                                    Commissioner of Patents